United States Patent [19]

Darncharnjitt

[11] 4,144,668

[45] Mar. 20, 1979

[54] INSECT TRAP

[76] Inventor: Kris Darncharnjitt, 413 W. 56th St., Apt #1, New York, N.Y. 10019

[21] Appl. No.: 834,548

[22] Filed: Sep. 19, 1977

[51] Int. Cl.² .......................... A01M 1/04; A01M 1/22
[52] U.S. Cl. ........................................ 43/107; 43/112;
43/113; 43/114; 43/121
[58] Field of Search ........................ 43/58, 64, 98, 107,
43/112, 114, 116, 113, 121

[56] References Cited

U.S. PATENT DOCUMENTS

| 2,038,495 | 4/1936 | Keller | 43/112 |
| 2,307,163 | 1/1943 | Shea | 43/112 |
| 3,197,916 | 8/1965 | Cole | 43/98 X |
| 3,243,913 | 4/1966 | Carriero | 43/98 |
| 4,074,456 | 2/1978 | Tidwell | 43/112 |

Primary Examiner—Nicholas P. Godici
Attorney, Agent, or Firm—Watson, Leavenworth, Kelton & Taggart

[57] ABSTRACT

An electrical detecting circuit using an S.C.R. or an integrated circuit and low voltage detects when an insect bridges a pair of electrodes whereupon entrapping means are activated. The entrapping means can be a trapdoor in the top of a container or an arrangement for applying higher voltage to said electrodes and/or additional electrodes to shock the insect dislodging it into a trap receptacle from which it cannot exit. One series of embodiments are adapted to trap crawling insects while another embodiment is adapted to trap flying insects. The trap works efficiently on cockroaches as well as other insects.

29 Claims, 11 Drawing Figures

INSECT TRAP

The present invention relates to insect traps.

Nature has its traps, the spider's web, the Venus flytrap; and man has been trapping creatures from time immemorial. Yet, a satisfactory entrapping arrangement adaptable to all varieties of insects, particularly crawling insects, in spite of a pressing need, does not appear to have been developed prior to the present invention. Especially in the case of crawling insects, only a few devices or implements for their elimination are known such as the poison bait ant trap. Where the common cockroach is concerned, exterminators employ poisons of one form or another. Flying insects have been captured in labyrinthine devices or by flypaper or have been electrocuted by high voltage grids.

In view of the present state of the art, it is an object of the present invention to provide an efficient trap for ensnaring the common cockroach and, as will appear hereinafter, various other insects.

In accordance with the present invention, there is provided such a trap having a location for an attractant and insect entrapping means, comprising in combination a plurality of conductive elements arranged such that an insect can encounter said conductive elements en route to said attractant location. An electric sensing circuit is provided including low voltage energizing means and detecting means coupled to said conductive elements with said low voltage means and said detecting means related such that the presence of an insect which encounters said conductive elements is detected before said insect can retreat in response to the level of electric current passing through its body exceeding its threshold of sensitivity thereto. Also provided are means coupled responsively to said detecting means for activating said entrapping means.

Although not limited thereto, the invention is suited admirably to the capture of the common cockroach and can best be explained with reference to such creatures. It has been discovered that a cockroach approaching an electrode energized by voltages as low as 6 volts D.C. somehow senses or feels the voltage, either because of the electrostatic field or some other phenomena, and reverses course shying away from said electrode. However, the present invention incorporates a detecting circuit which avoids this problem.

The invention will be better understood after reading the following detailed description of the presently preferred embodiments thereof with reference to the accompanying drawings in which.

Reference should now be had to the drawings wherein the same reference numerals are used throughout to designate the same or similar parts.

Figure 1:
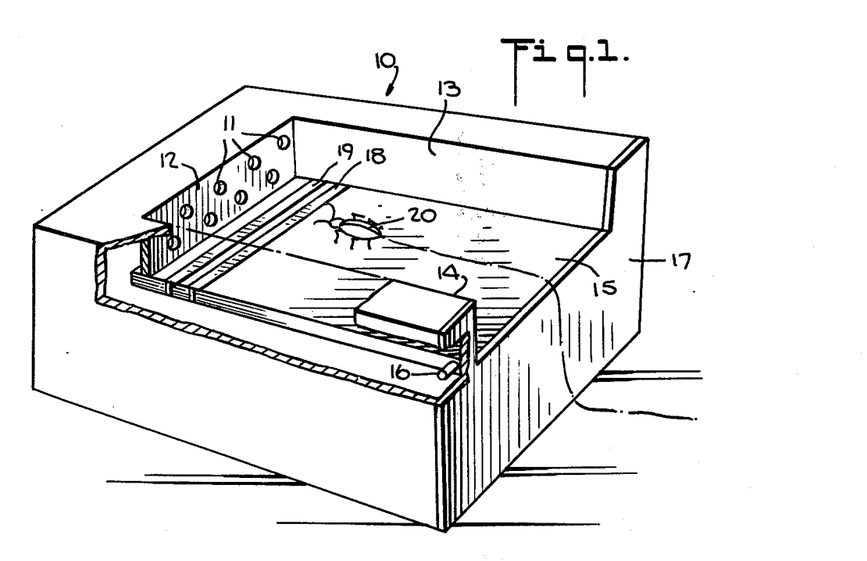
FIG. 1 is a perspective view, partially broken away, showing a so-called trapdoor embodiment of the present invention.

Directing attention to FIG. 1, there is shown a trap consisting of a container 10 that is essentially fully enclosed except for the plurality of apertures 11 in an end wall 12 of a recessed or depressed section defined by said end wall 12 and side walls 13 and 14. The floor of said recessed section consists of a trapdoor 15 mounted at one end for pivotal movement about a hinge member 16. The trapdoor 15 may be slightly longer than the distance from the front wall 17 of the container 10 to the wall 12 so that it underhangs wall 12 which acts as a stop to determine the limit of upward movement of the trapdoor 15.

While not shown in FIG. 1, the container 10 is provided with an accessible compartment behind wall 12 for holding an attractant or bait such that the odors or aroma from said bait can travel outwardly through the apertures 11 in said wall. Access to the bait may be had through a removable wall or section of a wall (not shown) of container 10.

The trapdoor 15 is provided with a pair of conductive elements 18 and 19 extending substantially completely thereacross and located at the end closest the wall 12. As illustrated in FIG. 1, the trapdoor 15 constitutes part of a pathway including the wall 17 over which an insect, such as the creature 20, must proceed in an approach to the apertures 11 and the bait within the container.

Figure 2:
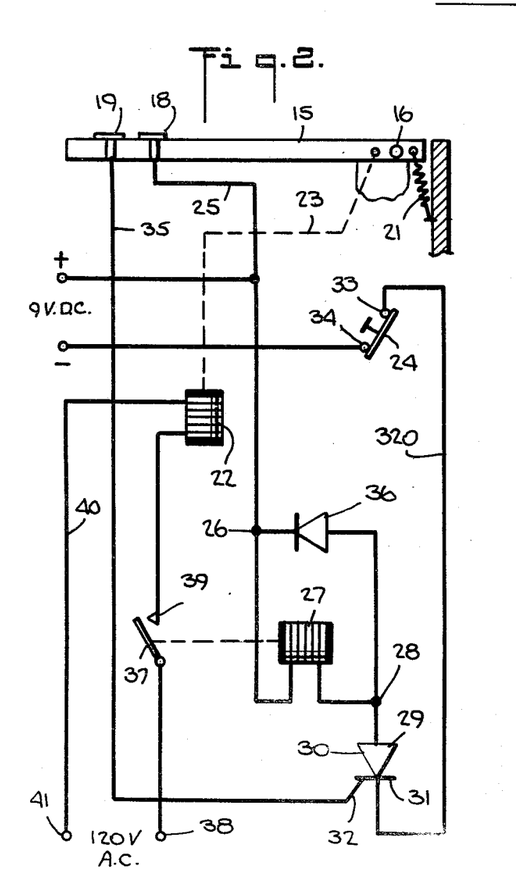
FIG. 2 is a schematic diagram showing the essential components of the detecting and trap actuating mechanism for the trap of FIG. 1.

The trapdoor 15 is maintained normally in the horizontal or "closed" position by a spring 21 shown in FIG. 2 to which attention should now be directed. A solenoid 22 is connected with trapdoor 15 by suitable mechanical linkage 23 for counteracting the pull of spring 21 and opening trapdoor 15 with a rapid and abrupt movement until the trapdoor 15 encounters the limit switch 24 which causes abrupt deceleration thereof.

The conductive elements 18 and 19 may consist of thin copper strips or the like affixed to or embedded in the upper surface of trapdoor 15. Strip 18 is connected over a suitable flexible or articulable connection 25 to both the positive terminal of a source of D.C. voltage, here shown as 9 volts, and to a junction 26 connected to one side of a relay winding 27. The other side of relay winding 27 is connected through junction 28 to the anode 29 of a silicon controlled rectifier (SCR) 30 having a cathode 31 and a gate electrode 32. The cathode 31 is connected over connection 320 to terminal 33 of limit switch 24. The other terminal 34 of limit switch 24 is connected to the negative terminal of the source of D.C. voltage. The gate electrode 32 of the SCR 30 is connected over a suitable flexible or articulable connection 35 to the conductive element 19. A diode 36 is connected with its cathode to junction 26 and its anode to junction 28. This places diode 36 in shunt with winding 27.

Relay winding 27 controls a normally open armature 37 connected to one terminal 38 arranged for connection to a source of A.C. line voltage, here shown as 120 volts. A stationary contact 39 which is engageable by armature 37 is connected to one side of solenoid 22 while the other side of solenoid 22 is connected over connection 40 to the second terminal 41 for connection to the source of A.C. line voltage.

As noted above, the D.C. voltage is 9 volts, while the A.C. line voltage is 120 volts. These values are only typical and may be varied in a manner that will be understood by anyone skilled in the electronic art. The line voltage and solenoid 22 should be matched while the D.C. voltage and SCR 30 and relay 27 should be matched maintaining the voltage low enough not to repel an insect. Satisfactory operation has been obtained with a circuit wherein relay winding 27 was designed for 6-volt operation, while SCR 30 was either a Motorola HEP R 1001 or Sylvania ECG 5400 S.C.R. The ratings of said SCR's are similar.

It will be understood that the flexible or articulable connections 25 and 35 coupled to elements 18 and 19, respectively, are such as to permit opening of trapdoor 15 while maintaining the electrical connections. It may also be observed that the electrodes 18 and 19 are connected across the direct current source in series with the gate-to-cathode impedance of SCR 30. This impedance, as well known, is extremely high, such that a negligible electrostatic field will be developed between the electrodes 18 and 19. Regardless of the technical explanation, it has been found that the voltage applied to electrodes 18 and 19 through the described circuit of FIG. 2 is insufficient to repulse an approaching cockroach. On the other hand, it has been found that as little as 6 volts of direct current connected directly between electrodes 18 and 19 will be sensed by an approaching cockroach and will repel the creature.

When an approaching cockroach, or other insect, establishes contact between electrodes 18 and 19, sufficient current flows through the creature to trigger the SCR 30 completing a circuit from the positive terminal of the source of direct current through relay winding 27, anode 29, cathode 31, connection 320, limit switch 24 back to the negative terminal of said source of direct current. This energizes relay winding 27 causing armature 37 to engage fixed contact 39 and apply the A.C. line voltage to solenoid 22 from terminals 38 and 41. Application of line voltage to solenoid 22 results in abrupt opening of trapdoor 15 followed by abrupt deceleration as it encounters the limit switch 24. The abrupt deceleration dislodges the cockroach or other insect that had been in the vicinity of electrodes 18 and 19 causing said insect to be deposited within container 10. As soon as limit switch 24 is engaged by trapdoor 15 it breaks the contact between its terminals 33 and 34 de-energizing relay winding 27 which, with the aid of ringing suppressor diode 36, rapidly opens armature 37 and releases solenoid 22 such that spring 21 closes trapdoor 15. If by chance the insect 20 is still in contact with electrodes 18 and 19 and has not been dislodged the trapdoor will be reopened by the control circuit and the entire operation will proceed through another complete cycle.

The aforesaid operation of the trap described with reference to FIGS. 1 and 2 will be repeated each time an insect traverses the pathway and engages electrodes 18 and 19. Within the container 10, the insects may be immobilized by lining the bottom of said container with flypaper or equivalent sticky material. Periodically, the trap may be cleaned by removing an exterior wall section (not shown) and changing the flypaper and, if necessary, the bait.

Figure 3:
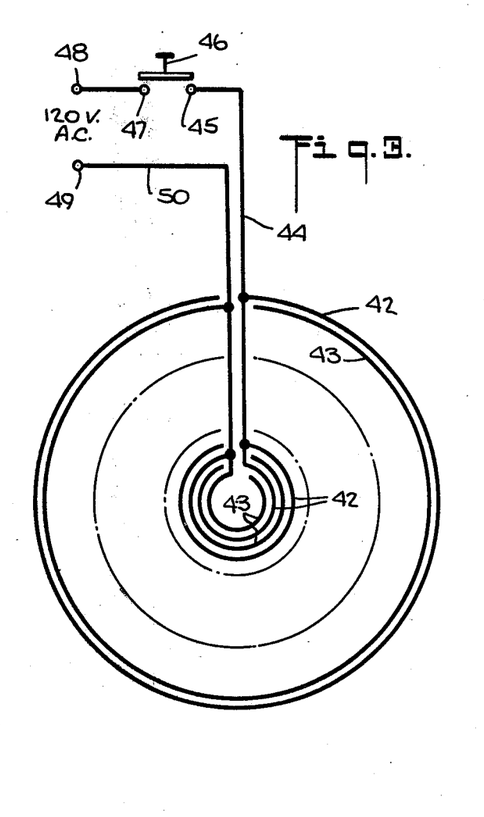
FIG. 3 is a schematic diagram of an immobilizing arrangement that may be used with any of the trap embodiments described herein intended to capture crawling insects.

Alternatively, a permanent immobilizing arrangement may be employed such as shown in FIG. 3 in place of the flypaper. Referring to FIG. 3, there is shown, somewhat schematically, a pattern of alternating electrodes 42 and 43. All the electrodes 42 are connected to a bus connection 44 leading to one fixed contact 45 of a normally open switch 46. The other fixed contact 47 of switch 46 is connected to a first terminal, 48, adapted to be connected to a source of A.C. line voltage. A second terminal, 49, adapted to be connected to said source of A.C. line voltage, is connected over a bus 50 to all the electrodes 43. It should be understood that while FIG. 3 shows the electrodes as a line, such electrodes in reality will have finite width with suitable spacing therebetween. The printed circuit pattern of electrodes 42 and 43 will be located on the bottom of the container 10 while the switch 46 may be located at any suitable place in an exterior wall of said container.

When it is desired to empty a trap incorporating the arrangement of FIG. 3, the switch 46 may be closed momentarily to apply line voltage of 120 volts or the like to the electrodes 42 and 43. This will apply sufficient voltage to the insects to immobilize them for a significant period of time long enough to remove them from the trap and dispose of same. It should be understood that the pattern of said electrodes need not be circular but may follow any appropriate configuration suitable to the configuration of the container 10. It also should be understood that the container 10 will be constructed with a double wall so that the detecting circuit and operating mechanism of FIG. 2 can be isolated from the inner compartment in which the insects are deposited and collected.

The detecting circuit described with reference to FIGS. 1 and 2 can be used with other entrapping means. An extremely versatile arrangement will now be described with reference to FIGS. 4 through 7 to which attention should now be directed. As seen therein the entrapping means comprises a container 51 with an opening 52 in the upper wall 53 thereof. A receptacle 54 for bait is supported on the bottom wall 55 of the container 51 below the opening 52 and may be removable, if desired. A partition wall 56 divides container 51 into two compartments for a reason that will appear hereinafter.

Figures 4, 5:
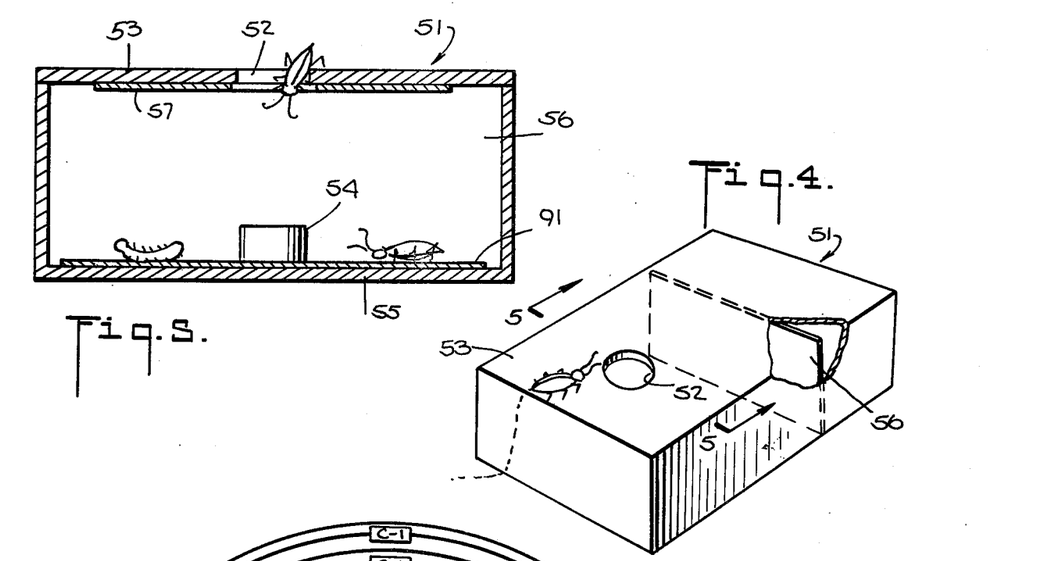
FIG. 4 is a perspective view of an electric shock inducing embodiment of the present invention.
FIG. 5 is a transverse sectional view taken along the line 5—5 of FIG. 4.

As observed from FIGS. 4 and 5 an insect approaching the trap will follow a path up to the opening 52 whereupon it must enter the container through said opening and cross the underside of wall 53 to a side wall heading toward the bottom wall of the container. Thus, it will be recognized that part of the pathway leading to the bait is contained within container 51.

The sensing electrodes or conductive elements previously described with reference to the embodiment of FIGS. 1 and 2 are also utilized in the embodiment of FIGS. 4 through 7. These electrodes are now disposed within container 51 surrounding opening 52 as part of an electrode array pattern on a printed circuit board 57 or the like. The geometry of the pattern contained on printed circuit board 57 is shown in detail in FIG. 6.

Figure 6:
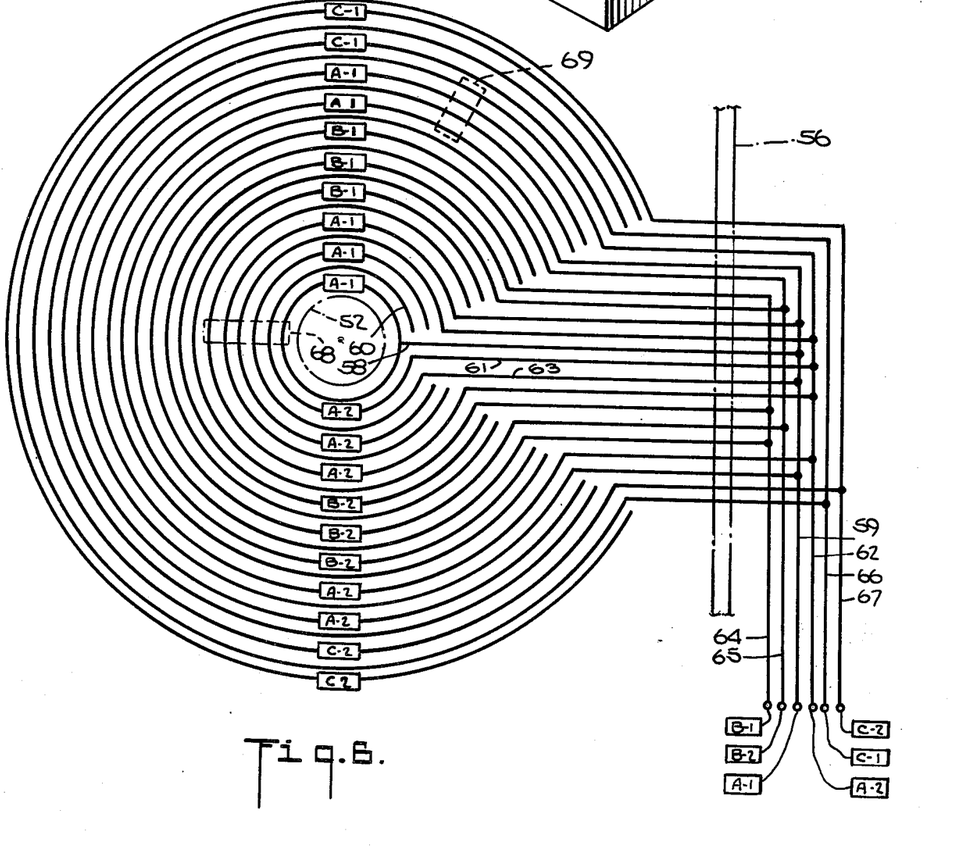
FIG. 6 is a schematic diagram of the printed circuit pattern incorporated in the embodiment of FIG. 4.

Referring now to FIG. 6, there is shown schematically the pattern of the electrodes on board 57. For convenience of illustration, the individual electrodes are represented by single solid lines although in reality said electrodes will have finite width. In a typical experimental embodiment of the invention, electrodes having a width of approximately 1/32 inches with spacing between adjacent electrodes of approximately 1/32 inches were employed. Starting at the center closest to the margin of opening 52 in container 51 is a closed circular electrode, designated A-1, connected by a conductor 58 to a bus connection 59 leading to a terminal having the same A-1 designation. The next radially outer electrode adjacent the innermost electrode is an electrode 60, designated A-2, and connected by conductor 61 to a bus 62 terminating in a terminal carrying the same A-2 designation. The next adjacent electrode is again an A-1 electrode which is connected by conductor 63 to bus 59. Following the same pattern, it will be observed that all of the A-1 electrodes are connected to bus 59 and that all A-2 electrodes are connected to bus 62.

Proceeding from the center radially outward, there are six electrodes alternating between A-1 and A-2. Next, there are six electrodes alternating between B-1 and B-2 which are connected, respectively, to bus connections 64 and 65. Proceeding radially outwardly again, there are four more electrodes alternating between A-1 and A-2 connected to the appropriate bus 59 and 62. These electrodes are then followed by four outermost electrodes alternating between C-1 and C-2 with the former connected to bus 66 and the latter connected to bus 67.

There are two groups of A electrodes. The group designated by the reference numeral 68 is closest to the opening 52, while the group designated by the reference numeral 69 is located between the B and the C groups.

As shown schematically in FIG. 6, the separating wall 56 isolates the bus connections from the compartment of the container 51 holding the bait receptacle 54 and the ring pattern of the electrodes. The various terminals of the bus connections 59, 62, 64, 65, 66 and 67 are connected to similarly labeled terminals on the circuit shown schematically in FIG. 7, the physical components of which may be located within the container 51 on the side of partition 56 remote from the opening 52.

Figure 7:
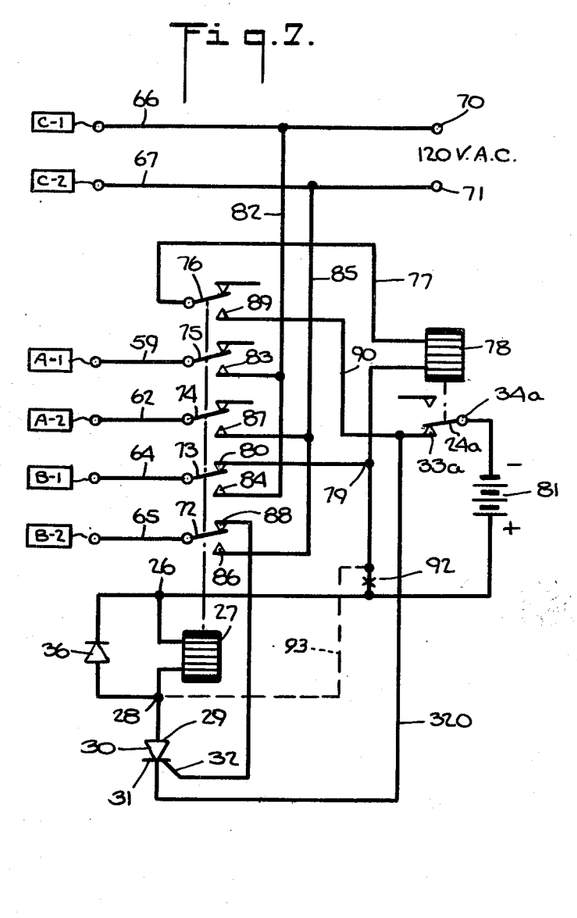
FIG. 7 is a schematic wiring diagram of a detecting and actuating circuit for the embodiment of FIG. 4.

Referring now to FIG. 7, the bus connections are carried through with connections 66 and 67 leading to terminals 70 and 71, respectively, for connection to a source of alternating current line voltage, e.g., at 120 volts. As mentioned previously, the detecting circuit in this embodiment is essentially the same as that described previously with reference to FIGS. 1 and 2. That is, essentially the same relay winding 27 and SCR 30 are employed under the control of the sensing electrodes which in this embodiment are represented by the B-1 and B-2 array. As shown in FIG. 7, relay winding 27 controls a bank of relay armatures 72, 73, 74, 75 and 76. Armature 72 is connected to bus 65, armature 73 is connected to bus 64, armature 74 is connected to bus 62, armature 75 is connected to bus 59 and armature 76 is connected over lead 77 to one side of a relay winding 78, also rated at 6 volts, the other side of which is connected to a junction 79, which is connected, in turn, both to a stationary contact 80 associated with armature 73 and to the junction 26 to which the positive terminal of the battery 81 is connected. Terminal 70 is connected over connection 82 to both stationary contact 83 and stationary contact 84 associated, respectively, with relay armatures 75 and 73. Source terminal 71 is similarly connected over connection 85 to stationary contacts 86 and 87 associated, respectively, with relay armatures 72 and 74. Gate electrode 32 of SCR 30 is connected to stationary contact 88 associated with relay armature 72. Relay armature 76 is associated with a stationary contact 89 which is connected over connection 90 to stationary contact 33a and connection 320. Stationary contact 33a forms a part of the contact assembly of relay winding 78 and its armature 24a which has its junction 34a connected to the negative terminal of the battery 81.

The operation of the circuit described with reference to FIGS. 6 and 7 can now be explained. As seen in FIG. 7, the relays are in their standby condition awaiting the approach of an insect. By tracing through the circuit it will be seen that the bus connections 64 and 65 are connected to the SCR 30 and relay winding 27 in the same manner as elements 18 and 19 were connected thereto in the embodiment of FIG. 2. The bus connections 66 and 67 are connected directly to the A.C. line voltage for a reason to be explained below. Bus connections 59 and 62 are coupled through the respective relay armatures 75 and 74 to unconnected back contacts of the relay. Hence, the electrodes A-1 and A-2 are de-energized at this time.

An insect enters the opening 52 as illustrated in FIG. 5 and commences to traverse the undersurface of wall 53 crossing the electrode pattern. The initial electrodes encountered by the insect are de-energized and do not alarm or repulse the same. In this way, the group 68 of electrodes provide a guard zone or region permitting the insect to penetrate the trap a significant distance before it is activated. This will, as will be apparent from the ensuing discussion, ensure against the insect racing out of the trap when activation takes place.

As soon as the insect bridges any pair of B-1/B-2 electrodes a circuit will be completed from the positive terminal of battery 81 through junction 79, relay contact 80, armature 73, bus 64, bus 65, armature 72, and contact 88 to the gate electrode 32 of SCR 30. This causes the latter to conduct and energize relay winding 27 actuating its armatures 72 through 76 to the downward position as viewed in the drawing. In this manner, all of the buses 59, 62, 64 and 65 are simultaneously switched to either connection 82 or 85 leading to the line voltage terminals 70 and 71. If the circuit is traced it will be observed that all of the conductive elements carrying the "-1" number will be connected to one side of the A.C. line, while all of the elements carrying a designation including the "-2" number will be connected to the opposite side of the A.C. line. Thus, full line voltage, in this case 120 volts, is applied across the insect. This is more than ample to shock the insect and dislodge it from the underside of the wall 53 in container 51 and cause the insect to drop to the bottom of the container. As with the previous embodiment described with reference to FIG. 1, flypaper or an electric grid as shown in FIG. 3 can be located on the bottom wall of container 51 where such component is represented by the layer 91.

When relay armature 76 engages stationary contact 89 it completes a circuit from battery 81 through relay winding 78 causing energization of the latter. Due to inertia and other known reasons, the opening of relay armature 24a from stationary contact 33a occurs a brief interval of time after relay armature 76 engages contact 89. As soon as the connection between armature 24a and contact 33a is broken, relay winding 27 is released and SCR 30 becomes nonconductive. Assuming no further insects bridging the sensing electrodes B-1 and B-2, the circuit will remain quiescent. On the other hand, if an insect still bridges the sensing electrodes the circuit will proceed through another oscillatory cycle as described above. It will be understood that upon release of armature 76 so that it breaks engagement with stationary contact 89 the relay winding 78 will be released causing the armature 24a to reengage contact 33a.

It has been found from experience that even full line voltage of 120 volts when applied to a cockroach is insufficient to kill the creature but merely stuns the same. As little as 9 volts D.C. applied to the electrodes directly will be sufficient to cause the creature to release its grip and be dislodged from the undersurface of wall 53. However, 120 volts A.C. tends to knock out the cockroaches for as much as 15 minutes or longer. With the use of flypaper on the bottom of the container, the chances of the insects returning up the side walls of the container in an attempt to reach the opening 52 are restricted. However, regardless of the method of immobilizing the insects at the bottom of the container they are still barred from reaching the opening 52 by the permanently energized outer barrier of electrodes C-1 and C-2.

The group 69 of electrodes is interposed between the permanently energized outer electrodes and the sensing electrodes B-1 and B-2 in order to ensure that a rapidly exiting insect does not somehow connect the C electrodes to the B electrodes applying alternating current line voltage to the detecting circuit and causing destruction thereof.

The width of each of the electrodes making up the pattern of FIG. 6 may be varied as well as the space between the electrodes in order to tailor the arrangement to different size insects. The dimensions mentioned previously have been found suitable for trapping the common cockroach. Additionally, a non-circular pattern of the electrodes may be used rather than the circular pattern illustrated in FIG. 6. The number of electrodes making up each group such as the group 68 and the group 69 as well as the sensing group and the outer barrier group may be varied, again depending upon the size of the creatures to be trapped.

It should be apparent that the operation of the circuit of FIG. 7 causes the application of the higher line voltage to the various conductive elements of FIG. 6 in the form of pulses of short duration and that said pulses are produced only so long as an insect is detected by the detecting means consisting of the elements B-1 and B-2 coupled to SCR 30.

If it is desired to reduce the sensitivity of the sensing circuit, the circuit of FIG. 7 may be modified by breaking the circuit at 92 and substituting the alternate connection 93 between junctions 28 and 79. This modification placed the impedance of winding 27 and diode 36 in series with the B sensing electrodes.

The container 51 is provided with a removable wall (not shown) to enable cleaning and emptying of the trap in much the same manner as that described with reference to the trap of FIG. 1.

Figure 8:
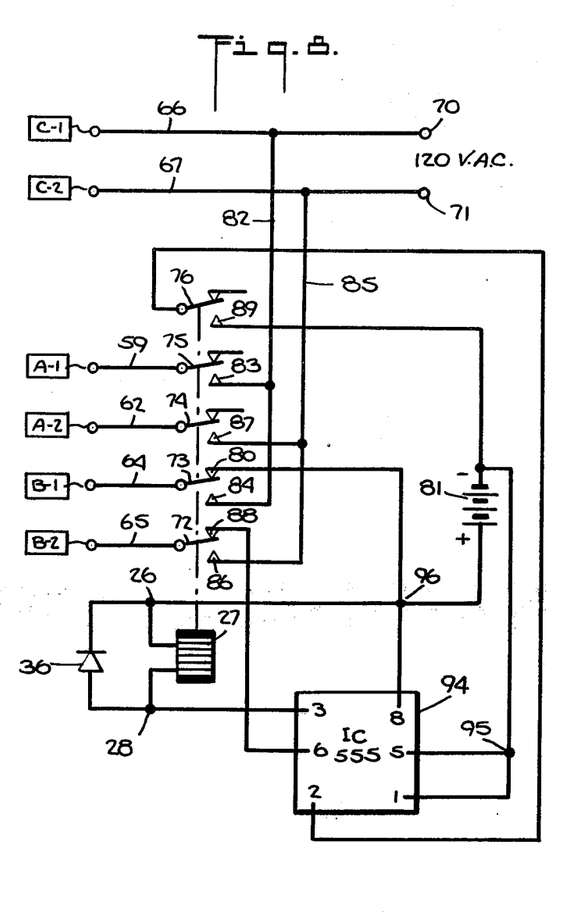
FIG. 8 is a schematic wiring diagram of a modified detecting and actuating circuit for the embodiment of FIG. 4.

The control circuit of FIG. 7 employs two electromagnetic relays, 27 and 78. It is possible to simplify the circuit eliminating electromagnetic relay 78 as well as SCR 30 by making use of an integrated circuit component. This modification is illustrated in FIG. 8 wherein the SCR 30 and relay 78 of FIG. 7 have been replaced by a monolithic integrated circuit unit 94. A Signetics type 555 integrated circuited has been found satisfactory. As shown, the ground terminal 1 and the control voltage terminal 5 are joined together at junction 95 and connected to the negative terminal of battery 81. The voltage input terminal 8 is connected to junction 96 which interconnects junction 26, the relay contact 80 and the positive terminal of battery 81. The trigger terminal 2 of circuit 94 is connected to the relay armature 76, output terminal 3 is connected to junction 28, and threshold terminal 6 is connected to relay contact 88. In other respects, the circuit is the same as that described with reference to FIG. 7.

The operation of the circuit of FIG. 8 is essentially identical to that of FIG. 7 in that relay 27 will be energized whenever an insect bridges a B-1 and a B-2 conductor. Engagement of relay contact 89 by armature 76 will reset monolithic circuit 94 releasing relay 27. The inherent time delay in the monolithic circuit 94 has been found to be satisfactory for the described use. Any equivalent integrated circuit may be used instead of the Signetics type 555 for the circuit 94. Obviously, other comparable integrated circuits may be used as will be apparent to those skilled in the art.

Figure 9:
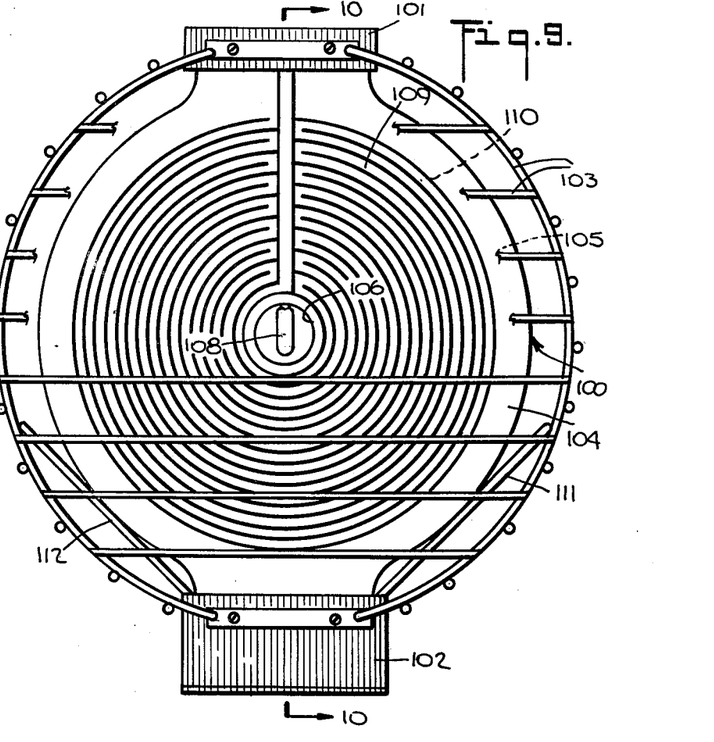
FIG. 9 is an end elevational view of a trap for flying insects in accordance with the present invention with portions of the protective grill broken away for clarity of illustration.
Figure 10:
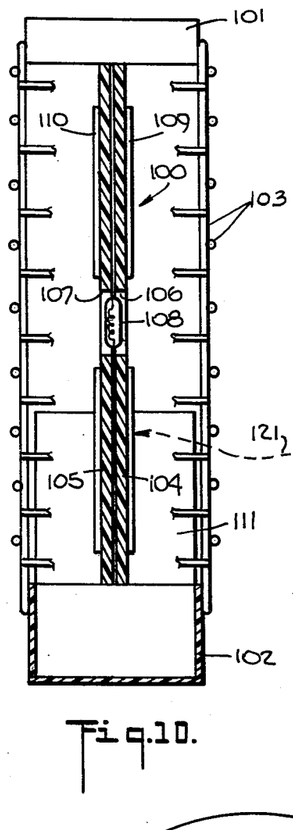
FIG. 10 is a longitudinal sectional view taken along the line 10—10 of FIG. 9.

Turning now to FIGS. 9 and 10, there is illustrated therein an embodiment of the invention intended to capture flying insects. The trap consists generally of a vertical barrier wall 100 disposed between an enclosure 101 to contain the electrical sensing and control circuit and a receptacle 102 for receiving insects when dislodged from the barrier wall 100, and a protective grill or guard screen 103 to preclude inadvertent contact by the user with the internal electrical components. As shown in the drawings, the enclosure 101 is located at the top and the receptacle 102 is located at the bottom with the guard screen 103 being joined to both and integrating the assembly into a single unit with the barrier wall 100 disposed centrally thereof.

In this example, the barrier wall 100 consists of two layers or sheets of insulating material 104 and 105, each with a central aperture, 106 and 107, respectively. The two layers 104 and 105 are sandwiched together with a small lamp or bulb 108 located in the space provided by the apertures 106 and 107 and the electric leads to the lamp 108 passing upwardly between the two layers 104 and 105 to the circuit in enclosure 101 to be described below. The exposed faces of layers 104 and 105 contain, respectively, electrode patterns 109 and 110. The details of said electrode patterns 109 and 110 will be described below. As seen best in FIG. 9, the lamp 108 is visible from a large surrounding area and will function, when energized, as an attractant to lure insects that approach the vicinity of the trap. Also seen in FIG. 9 are deflector plates 111 and 112 angled outwardly on opposite sides of receptacle 102 for guiding insects dislodged from the surfaces of barrier wall 100 into the receptacle 102.

Figure 11:
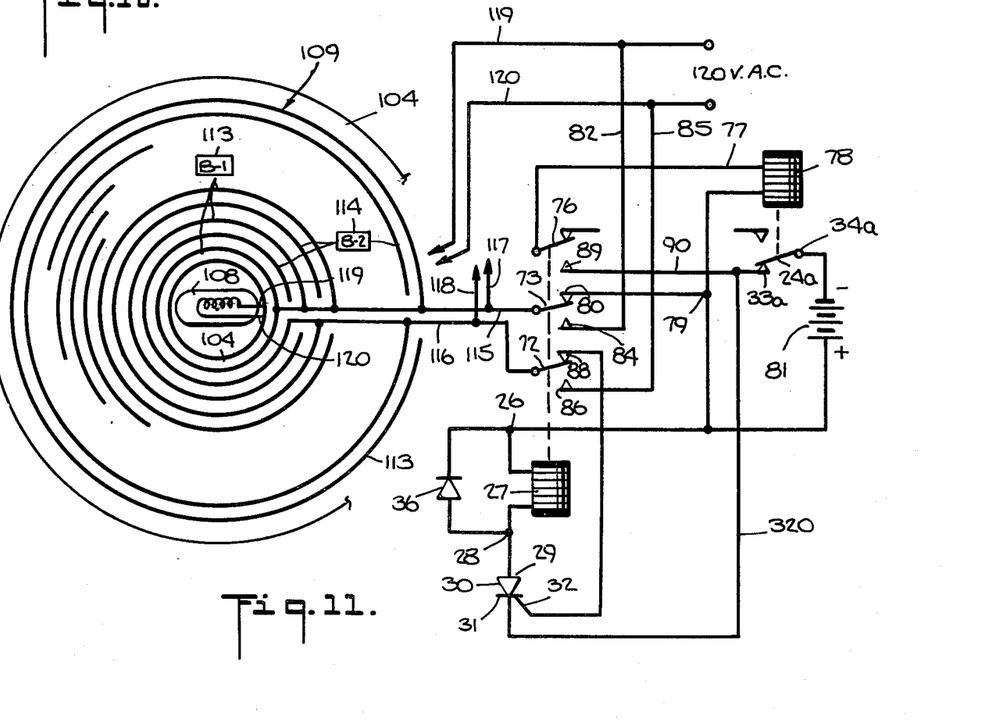
FIG. 11 is a schematic diagram showing the printed circuit pattern incorporated in the embodiment of FIGS. 9 and 10 along with a detecting and actuating circuit therefor.

Referring to FIG. 11, there is shown therein the electrode patterns and control circuit utilized in the trap of FIGS. 9 and 10. The electrode patterns 109 and 110 may be identical and, therefore, only one of said patterns, for example 109 is illustrated in FIG. 11 and is represented therein schematically. As shown in FIG. 11, pattern 109 consists of alternating conductive elements or electrodes 113 and 114. All the electrodes 113 are connected to a bus connection 115 which leads to armature 73, while all of electrodes 114 are connected to a bus connection 116 which leads to armature 72, both armatures 72 and 73 being controlled by relay 27. It will be observed by comparing FIG. 11 with FIG. 7 that the control circuit is identical with the exception of deletion in FIG. 11 of relay armatures 74 and 75 and the associated electrodes as well as the connections 66 and 67 from the line voltage terminals 70 and 71 to the C electrodes. Both the A and C type electrodes of FIG. 6 are not utilized in the embodiment of FIGS. 9, 10 and 11. Instead, all of the electrodes are of the B type arranged to function as sensing and shocking electrodes.

As mentioned above, the electrode pattern 110 may be identical to the pattern 109 and will have its corresponding alternate electrode members similarly connected to the bus connections 115 and 116, respectively, by connections 117 and 118. Referring to FIG. 11, it should be understood that the layer of insulating material 105 with its pattern 110 is located behind the layer 104 where it is not visible and that the connections 117 and 118 will lead to the same.

Also as shown schematically in FIG. 11, the leads 119 and 120 from lamp 108 are connected to the 120 V. A.C. terminals, although a low voltage lamp might be used in which case connections would be made to battery 81.

Since all of the electrodes employed in the embodiment of FIG. 11 perform a sensing function, they may be considered similar to the B-1 and B-2 electrodes of FIG. 6 and have been so designated. For clarity of illustration, not all of the electrodes have been shown in FIG. 11 but it should be understood that there is a continuous pattern of alternating electrodes from the innermost electrode to the outermost electrode. Furthermore, it should be understood that while the electrodes are shown as a line, such electrodes in reality will have finite width with suitable spacing therebetween.

In standby condition, the lamp 108 is illuminated to attract flying insects which enter the trap through the openings in the grill 103. For example, the insect may enter along the broken line arrow path 121 attracted by the lamp 108. In due course, the insect is likely to encounter the barrier wall 100 and land thereon. As soon as it engages any pair of adjacent electrodes in the layer 109 (or 110 if it enters on the other side) it will trigger the detecting circuit located in enclosure 101 causing line voltage to be applied to all of the electrodes shocking the insect and causing it to fall into the receptacle 102. The receptacle 102 may contain a liquid for drowning the insect or flypaper or some other instrumentality for permanently entrapping said insect. The bottom wall or other closure of compartment 102 may be removable for cleaning and for eliminating the trapped insects.

It should be apparent that the trap described with reference to FIGS. 9, 10 and 11 is exemplary and that the physical arrangement may take many forms. The electrode pattern need not be circular but may have any other suitable configuration, it may be located on curved walls rather than on a flat wall. A labyrinthian trap may be constructed with the conductive element pattern or patterns located on appropriate walls of the labyrinth wherever the insect is likely to land. It should also be understood that instead of the SCR and separate relay circuit shown in FIG. 11 the control circuit may employ an integrated circuit such as shown in FIG. 8.

From the foregoing discussion, it should be evident that the various embodiments having an electrical trap incorporate a circuit requiring an oscillatory device of one form or another to be energized whenever an insect engages the sensing electrodes and to cause the application of higher voltage to such electrodes for a brief interval whereupon the circuit resets to its initial condition. Referring to FIG. 7, the relay 27 could be replaced by a rotary electric motor driving a series of switches which take the place of the relay contacts. One switch can be utilized to interrupt the motor operation after a discrete period of time and to reset the SCR. For example, the motor may be inserted as a direct substitution for relay winding 27. Relay 78 and its interconnections are omitted. The negative terminal of battery 81 is connected directly to the cathode 31 of SCR 30 and also to the motor driven equivalent of normally open contact 89. The equivalent of armature 76 is connected to junction 28. The motor driven switches taking the place of relay armatures 72 to 76 can be cam driven or in the form of a drum switch such that elements make and break contacts in a pattern equivalent to that achieved by relay 27. Element 76 should make contact almost immediately with contact 89 completing a holding circuit through the motor and bypassing the anode-cathode circuit of SCR 30. This resets SCR 30. After a determined interval of rotation of the motor the elements 76 and 89 can separate to stop the motor and return control to SCR 30. Instead of a rotary motor there can also be used a linear motor or solenoid actuating a set of contacts and operating similar to a common buzzer or bell. Numerous other changes will occur to those skilled in the art without departing from the true spirit of the invention as defined in the appended claims.

When describing the circuit operation throughout this specification the direction of current flow has been assumed to be in the classic sense from the positive to the negative terminal of the battery and opposite to the direction of electron flow.

Although not mentioned previously, the battery 81 in the embodiments of FIGS. 7, 8 and 11 may have a 9-volt output, although such value is only typical and may, along with the 120 volt line voltage, be varied in a manner that will be understood by anyone skilled in the electronic art. The DC voltage and SCR 30 or integrated circuit 94 and relay 27 should be matched maintaining the voltage low enough not to repel an insect. It should be understood that where the same reference numeral is used in more than one figure, the same criteria are employed for choosing that component.

What is claimed is:

1. A trap for insects having a location for an attractant and insect entrapping means, comprising in combination a plurality of conductive elements arranged such that an insect can encounter said conductive elements en route to said attractant location, an electric sensing circuit including low voltage energizing means and detecting means coupled to said conductive elements with said low voltage means and said detecting means related such that the presence of an insect which encounters said conductive elements is detected before said insect can retreat in response to the level of electric current passing through its body exceeding its threshold of sensitivity thereto, and means coupled responsively to said detecting means for actuating said entrapping means.

2. A trap for crawling insects having a location for bait, a pathway leading toward said bait location, and insect entrapping means, comprising in combination a plurality of conductive elements arranged in said pathway such that an insect must cross said conductive elements en route to said bait location, an electric sensing circuit including low voltage energizing means and detecting means coupled to said conductive elements with said low voltage means and said detecting means related such that the presence of an insect which encounters said conductive elements is detected before said insect can retreat in response to the level of electric passing through its body exceeding its threshold of sensitivity thereto, and means coupled responsively to said detecting means for activating said entrapping means.

3. A trap according to claim 2, wherein said entrapping means comprises a container with an opening in a wall thereof, said bait location and at least one part of said pathway being within said container, the said conductive elements being disposed within said container surrounding said opening, and means for dislodging an insect from said one part of said pathway to deposit said insect further within said container upon activation of said detecting means.

4. A trap according to claim 3, wherein said means for dislodging an insect comprises means for applying a higher voltage than said low voltage to said conductive elements sufficient to shock said insect upon activation of said detecting means.

5. A trap according to claim 4, wherein said means for dislodging an insect comprises a further plurality of conductive elements disposed around said opening in said one part of said pathway between said opening and said first plurality of conductive elements, and means for applying said higher voltage to said further conductive elements simultaneously with its application to said first plurality of conductive elements.

6. A trap according to claim 3, wherein said means for dislodging an insect comprises a further plurality of conductive elements disposed around said opening in said one part of said pathway between said opening and said first plurality of conductive elements, said further elements normally being deenergized, and means for applying a voltage to said further conductive elements sufficient to shock said insect upon activation of said detecting means.

7. A trap according to claim 4, wherein said means for dislodging an insect comprises a further plurality of conductive elements disposed around said opening in said one part of said pathway, said further elements being disposed in three separate groups, a first of said groups being between said opening and said first plurality of conductive elements, and the second and third of said groups being on the opposite side of said first elements from said first group with said third group being furthest from said opening, means for applying said higher voltage continually to the elements of said third group, and means for applying said higher voltage to the elements of said first and second groups simultaneously with its application to said first plurality of conductive elements.

8. A trap according to claim 7, wherein the application of said higher voltage to said first plurality of conductive elements and to the elements of said first and second groups is in the form of pulses of short duration, said pulses being produced only so long as an insect is detected by said detecting means.

9. A trap according to claim 2, wherein said entrapping means comprises means for dislodging an insect from said pathway, said last mentioned means being coupled to said means for activating the entrapping means, and means for preventing said insect from returning to said pathway.

10. A trap according to claim 9, wherein said means for preventing return to said pathway comprises sticky paper.

11. A trap according to claim 9, wherein said means for preventing return to said pathway comprises two groups of interleaved conductive elements, and means for selectively applying immobilizing voltage between said two groups.

12. A trap according to claim 2, wherein said entrapping means comprises a container with an inwardly opening trapdoor in an upper wall thereof, said trapdoor constituting at least part of said pathway and supporting said conductive elements thereon, and said activating means are coupled to said trapdoor for rapidly opening and closing same with abrupt deceleration at the point of maximum opening to deposit an insect within said container upon activation of said detecting means.

13. A trap according to claim 12, wherein the bottom of said container is lined with sticky paper.

14. A trap according to claim 12, wherein the bottom of said container is provided with two groups of interleaved conductive elements, and means are provided for selectively applying immobilizing voltage between said two groups.

15. A trap according to claim 8, wherein the bottom of said container is lined with sticky paper.

16. A trap according to claim 8, wherein the bottom of said container is provided with two groups of interleaved conductive elements, and means are provided for selectively applying immobilizing voltage between said two groups.

17. A trap according to claim 1, wherein said electric sensing circuit comprises a silicon controlled rectifier having an anode, a cathode and a gate electrode, a source of low voltage direct current having a positive and a negative terminal, means coupling at least a first one of said conductive elements to said gate electrode, relay means, means coupling said positive terminal of said source of low voltage through said relay means to said anode, means coupling said cathode to said negative terminal of said source of low voltage, means coupling at least a second one of said plurality of conductive elements which is immediately adjacent to said first one of said conductive elements to said positive terminal of said source of low voltage, and means coupling said relay means operatively to said entrapping means.

18. A trap according to claim 17, wherein said second one of said plurality of conductive elements is coupled through said relay means to said positive terminal of said source of low voltage.

19. A trap according to claim 17, wherein said entrapping means comprises a plurality of relay switching means under the control of said relay means, a source of higher voltage than said low voltage, two of said relay switching means being interposed in the coupling to said conductive elements and interconnected with said source of higher voltage responsive to energization of said relay means for changing the coupling of said conductive elements from said silicon controlled rectifier and said source of low voltage to said source of higher voltage, means for interrupting the flow of current to said rectifier, and means coupling another of said relay switching means to said interrupting means.

20. A trap according to claim 1, wherein said electric sensing circuit comprises: a monolithic integrated circuit having two stable modes of operation, first and second voltage input terminals for connection respectively to a positive and negative terminal of a source of direct current voltage, a voltage sensitive terminal for supplying a voltage thereto for shifting said integrated circuit from the first of said modes to the second, a reset terminal for applying a signal to said integrated circuit to return said circuit to said first mode, an output terminal which is open circuited in said first mode and is connected to said second voltage input terminal in said second mode; a source of low voltage direct current; means coupling at least a first one of said plurality of conductive elements to said voltage sensitive terminal; means coupling a positive terminal of said source of low voltage to at least a second one of said plurality of conductive elements which is immediately adjacent to said first one of said conductive elements; relay means; means coupling said positive terminal of said source of low voltage through said relay means to said output terminal; means coupling said first and second voltage input terminals, respectively, to said positive terminal and to a negative terminal of said source of low voltage; and means coupling said relay means operatively to said entrapping means.

21. A trap according to claim 20, wherein said entrapping means comprises a plurality of relay switching means under the control of said relay means, a source of higher voltage than said low voltage, two of said relay switching means being interposed in the coupling to said conductive elements and interconnected with said source of higher voltage responsive to energization of said relay means for changing the coupling of said conductive elements from said monolithic integrated circuit and said source of low voltage to said source of higher voltage, and means coupling another of said relay switching means to said reset terminal for applying a resetting signal thereto.

22. A trap according to claim 7, wherein said electric sensing circuit and entrapping means comprises a silicon controlled rectifier having an anode, a cathode and a gate electrode, a source of low voltage direct current having a positive and a negative terminal, a relay having a relay winding and five movable contacts under its control, means coupling a first set of alternate elements from said first plurality of conductive elements through a first one of said movable contacts and an associated normally closed back contact to said gate electrode, means coupling said positive terminal of said source of low voltage through said relay winding to said anode, a second relay having a relay winding and a movable contact under its control, means coupling said cathode through said second relay movable contact and an associated normally closed back contact to said negative terminal of said source of low voltage, said movable contact of said second relay breaking contact with its said associated normally closed back contact whenever said second relay winding is energized, means coupling a second set of alternate elements alternating with said first set from said first plurality of conductive elements through a second one of said five movable contacts and an associated normally closed back contact to said positive terminal of said source of low voltage, means coupling said second relay winding between said positive terminal of said source of low voltage and a third one of said five movable contacts, said third one of said five movable contacts having a normally open forward contact associated with it and coupled to said back contact of said second relay, means coupling alternate conductive elements from said first and second groups respectively to a fourth and fifth one of said five movable contacts, each of said first, second, fourth and fifth movable contacts having associated therewith a corresponding first, second, fourth and fifth normally open forward contact, means coupling said first and fourth normally open forward contact to one side of said means for applying said higher voltage, and means for coupling said second and fifth normally open forward contact to the other side of said means for applying said higher voltage.

23. A trap according to claim 7, wherein said electric sensing circuit and entrapping means comprises: a monolithic integrated circuit having two stable modes of operation, first and second voltage input terminals for connection respectively to a positive and negative terminal of a source of direct current voltage, a voltage sensitive terminal for supplying a voltage thereto for shifting said integrated circuit from the first of said modes to the second, a reset terminal for applying a signal to said integrated circuit to return said circuit to said first mode, an output terminal which is open circuited in said first mode and is connected to said second voltage input terminal in said second mode; a source of low voltage direct current having a positive and a negative terminal; a relay having a relay winding and five movable contacts under its control; means coupling a first set of alternate elements from said first plurality of conductive elements through a first one of said movable contacts and an associated normally closed back contact to said voltage sensitive terminal; means coupling said positive terminal of said source of low voltage through said relay winding to said output terminal; means coupling said first and second voltage input terminals, respectively, to said positive and negative terminals of said source of low voltage; means coupling a second set of alternate elements alternating with said first set from said first plurality of conductive elements through a second one of said five movable contacts and an associated normally closed back contact to said positive terminal of said source of low voltage; means coupling said reset terminal to a third one of said five movable contacts, said third one of said five movable contacts having a normally open forward contact associated with it and coupled to said negative terminal of said source of low voltage; means coupling alternate conductive elements from said first and second groups respectively to a fourth and fifth one of said five movable contacts, each of said first, second, fourth and fifth movable contacts having associated therewith a corresponding first, second, fourth and fifth normally open forward contact; means coupling said first and fourth normally open forward contact to one side of said means for applying said higher voltage; and means for coupling said second and fifth normally open forward contact to the other side of said means for applying said higher voltage.

24. A trap according to claim 19, wherein all of said plurality of conductive elements are coupled alternately to said gate electrode and to said positive terminal of said source of low voltage, respectively through a corresponding one of said two relay switching means.

25. A trap according to claim 1, wherein said electric sensing circuit comprises a silicon controlled rectifier having an anode, a cathode and a gate electrode, a source of low voltage direct current having a positive and a negative terminal, means coupling at least a first one of said conductive elements to said gate electrode, motor means, means coupling said positive terminal of said source of low voltage through said motor means to said anode, means coupling said cathode to said negative terminal of said source of low voltage, means coupling at least a second one of said plurality of conductive elements which is immediately adjacent to said first one of said conductive elements to said positive terminal of said source of low voltage, and switching means coupling said motor means operatively to said entrapping means and for interrupting operation of said motor means.

26. A trap according to claim 1, wherein said electric sensing circuit comprises: a monolithic integrated circuit having two stable modes of operation, first and second voltage input terminals for connection respectively to a positive and negative terminal of a source of direct current voltage, a voltage sensitive terminal for supplying a voltage thereto for shifting said integrated circuit from the first of said modes to the second, a reset terminal for applying a signal to said integrated circuit to return said circuit to said first mode, an output terminal which is open circuited in said first mode and is connected to said second voltage input terminal in said second mode; a source of low voltage direct current; means coupling at least a first one of said plurality of conductive elements to said voltage sensitive terminal; means coupling a positive terminal of said source of low voltage to at least a second one of said plurality of conductive elements which is immediately adjacent to said first one of said conductive elements; motor means; means coupling said positive terminal of said source of low voltage through said motor means to said output terminal; means coupling said first and second voltage input terminals, respectively, to said positive terminal and to a negative terminal of said source of low voltage; and switching means coupling said motor means operatively to said entrapping means and to said reset terminal.

27. A trap for flying insects having a location for an attractant and insect entrapping means, comprising in combination a plurality of conductive elements arranged in the vicinity of said attractant location such that a flying insect can encounter said conductive elements, an electric sensing circuit including low voltage energizing means and detecting means coupled to said conductive elements with said low voltage means and said detecting means related such that the presence of an insect which encounters said conductive elements is detected before said insect can retreat in response to the level of electric current passing through its body exceeding its threshold of sensitivity thereto, and means coupled responsively to said detecting means for activating said entrapping means.

28. A trap according to claim 27, wherein said entrapping means comprises means for applying a higher voltage than said low voltage to all of said conductive elements sufficient to shock said insect upon activation of said detecting means.

29. A trap according to claim 28, wherein said conductive elements are disposed upon the surface of a vertical wall, an open top receptacle is disposed below said wall such that when an insect is dislodged from said wall upon said application of a higher voltage to said conductive elements said insect falls into said receptacle, and said receptacle is constructed such that means can be provided therein for preventing insects from exiting therefrom.

* * * * *

UNITED STATES PATENT OFFICE
CERTIFICATE OF CORRECTION

PATENT NO. : 4,144,668

DATED : March 20, 1979

INVENTOR(S) : Kris Darncharnjitt

It is certified that error appears in the above-identified patent and that said Letters Patent are hereby corrected as shown below:

Column 11, line 10, after "electric" insert --current--.

Signed and Sealed this

Twenty-fifth Day of September 1979

[SEAL]

Attest:

LUTRELLE F. PARKER

*Attesting Officer*   *Acting Commissioner of Patents and Trademarks*